United States Patent [19]

Sudworth

[11] 4,124,739
[45] Nov. 7, 1978

[54] ALKALI METAL-SULPHUR CELLS

[75] Inventor: James L. Sudworth, Burton-on-Trent, England

[73] Assignee: Chloride Silent Power Ltd., London, England

[21] Appl. No.: 808,012

[22] Filed: Jun. 20, 1977

[30] Foreign Application Priority Data

Nov. 28, 1974 [GB] United Kingdom ............... 51637/74

Related U.S. Application Data

[63] Continuation of Ser. No. 634,010, Nov. 21, 1975, abandoned.

[51] Int. Cl.$^2$ ........................................... H01M 10/39
[52] U.S. Cl. .................................... 429/61; 429/93; 429/104
[58] Field of Search ............... 429/93, 104, 92, 22, 429/61, 91

[56] References Cited

U.S. PATENT DOCUMENTS 3,416,131  12/1968  MacKenzie et al. ............... 340/59
3,720,869  3/1973  Rowlette ............................ 429/93
3,770,502  11/1973  Takashi ............................ 429/104
3,915,741  10/1975  Takashi ............................ 429/72
3,932,195  1/1976  Evans et al. ...................... 429/104

Primary Examiner—Donald L. Walton
Attorney, Agent, or Firm—Fred Philpitt

[57] ABSTRACT

An arrangement for controlling the charge and/or discharge cycles of an alkali-metal/sulphur cell or battery has detecting means for detecting predetermined high and/or low levels of alkali-metal in the anode compartment of a cell or in an alkali-metal reservoir communicating with the anode compartment whereby the end of the charge and/or discharge cycles is determined. Alternatively, similar detecting means can be associated with an alkali-metal/alkali-metal cycling device which is connected electrically in series with a group of series-connected cells of an alkali-metal/sulphur battery to determine the end of the charge and/or discharge cycles of the battery.

10 Claims, 3 Drawing Figures

ALKALI METAL-SULPHUR CELLS

This is a continuation of application Ser. No. 634,010, filed Nov. 21, 1975 now abandoned.

This invention relates to arrangements for controlling the charge and/or discharge cycles of alkali-metal/sulphur cells and of alkali-metal/sulphur batteries made up of a plurality of such cells electrically interconnected. An alkali-metal/sulphur battery may consist of a single group of alkali-metal/sulphur cells electrically interconnected in series or a plurality of such groups, the groups being connected in parallel with each other.

An alkali-metal/sulphur cell comprises basically an anode compatment (i.e. alkali-metal compartment) and a cathode compartment (i.e. sulphur compartment) separated from each other by a solid electrolyte which is an alkali-metal ion conductor. The cell is operated at a temperature such that the electrochemical reactants are in the molten state. During dishcarge of the cell polysulphides of the alkali metal are formed in the cathode compartment resulting in displacement of alkali-metal from the anode compartment.

There is some evidence that over-charging and over-discharging of alkali-metal/sulphur cells have a detrimental effect on their performance. With single cells such over-charging and over-discharging can be prevented by measuring accurately the cell voltage and terminating the charge and discharge when certain high and low voltage levels have been attained. With a battery made up of series/parallel arrangements of cells, the monitoring of individual cell voltage is difficult and costly.

The object of the present invention is to provide an arrangement for controlling the charge and/or discharge cycles of an alkali-metal/sulphur cell or battery in a manner not requiring the determination of cell voltage.

According to the present invention in an arrangement for controlling the charge and/or discharge cycles of an alkali-metal/sulphur cell, detecting means are provided for detecting predetermined high and/or low levels of alkali-metal in the anode compartment or in an alkali-metal reservoir communicating with the anode compartment whereby the end of the charge and/or discharge cycles is determined.

Said detecting means for detecting the predetermined high level of alkali-metal in the anode compartment of the cell or in a reservoir communicating with the anode compartment may, when the predetermined high level is reached, complete a circuit through the alkali-metal for charging current, which circuit shunts the cathode compartment of the cell. Said detecting means for detecting the predetermined low level of alkali-metal in the anode compartment may, when said predetermined low level is reached, introduce a high resistance into the discharge circuit of the cell or into a detector circuit to effect the termination of the discharge cycle.

In the case of a battery, each individual cell may be provided with an arrangement in accordance with the invention or one or more cells may act as a control cell for a plurality of further cells of the battery and thus be provided with an arrangement in accordance with the invention. Alternatively, an alkali-metal/alkali-metal cycling device may be electrically connected to the battery as a control cell and constitute an arrangement in accordance with the invention.

By an alkali-metal/alkali-metal cycling device is meant a device which has the same basic form as an alkali-metal/sulphur cell, but which contains no sulphur material. When such a device is connected to a d.c. supply such that the compartment containing the sodium is connected to the positive pole of the d.c. source the sodium will be displaced to the other compartment by sodium ion transfer through the electrolyte. If after transfer of the sodium the polarity connections of the d.c. source are reversed the sodium will be displaced back again to its initial compartment. Thus cyclic operation of the device can be achieved by periodic reversal of the polarity connections of the d.c. source. Hence if the device is electrically connected in series with one or more alkali-metal/sulphur cells its cyclic operation will correspond to the charge-discharge pattern of the alkali-metal/sulphur cells, which act as the d.c. source during discharge.

Thus the alkali-metal/alkali-metal cycling device has detecting means for detecting predetermined high and/or low levels of alkali-metal in one or both compartments of the device, whereby the end of the charge and/or discharge cycles of the battery is determined. The detecting means may be similar to that provided for an alkali-metal/sulphur cell.

Two sodium/sulphur cell constructions and one battery construction embodying arrangements in accordance with the invention for controlling the charge and discharge cycles will now be described by way of example with reference to the accompanying diagrammatic drawings, in which.

Figure 1:
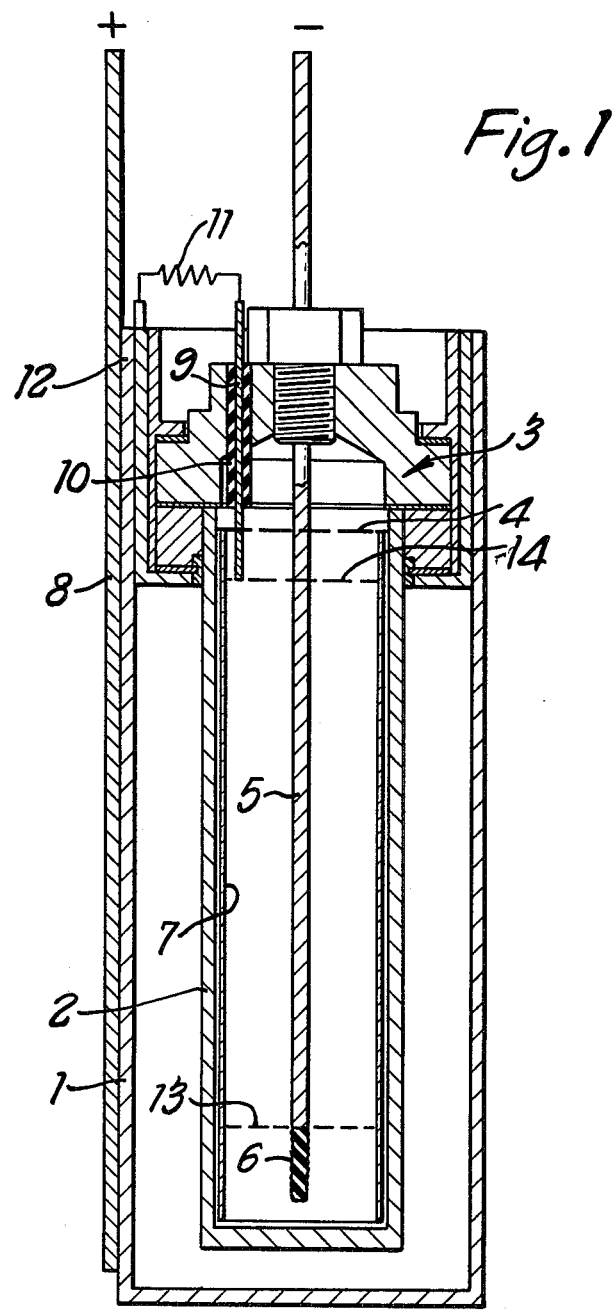
FIG. 1 shows a sectional elevation through the first cell construction.

Referring to FIG. 1, the cell is of tubular form and comprises an outer tubular casing 1 of steel e.g. stainless steel and an inner tube 2 of beta-alumina constituting the solid electrolyte of the cell. The open ends of the tubes 1 and 2 are closed by a closure and sealing arrangement 3. The closure and sealing arrangement 3 forms no part of the present invention and will not be described further.

The interior of the tube 2 constitutes the anode compartment of the cell and at the same time a sodium reservoir and during assembly of the cell is filled with sodium to the level indicated at 4. A current collecting pole in the form of a conductor rod 5 extends down into the tube 2. At its lower end the rod 5 has a short rod 6 of insulating material joined to it. The outer surface of the rod 6 is corrugated. Extending closely adjacent the inner surface of the tube 2 is a metal plate 7 which is spaced a predetermined small distance from the inner surface of the tube 2. For example the plate 7 may be made of spring steel which when bent round to fit into the tubes is urged by its resilience towards the tube 2, small dimples on the plate creating the desired spacing from the inner surface of the tube 2. The spacing between the tube 2 and plate 7 is such that as the sodium level in the tube 2 falls, sodium will be retained by capillary action in the space between tube 2 and plate 7 to maintain the distribution of the sodium over the whole inner surface of the electrolyte and so maintain the performance of the cell during discharge. Thus the space between the tube 2 and plate 7 constitutes the anode compartment of the cell and the space within the plate 7 the sodium reservoir.

The annular space between the tubes 1 and 2 constitutes the cathode compartment of the cell and in the charged state of the cell contains sulphur. To provide electronic conductivity in the annular space it is filled with carbon felt material into which the sulphur is impregnated prior to its assembly into the cell. A current collecting pole 8 is fixed to the outer casing 1 of the cell.

Extending through the sealing arrangement 3 of the cell is an electronically conducting rod 9. The rod 9 extends down into the tube 2 a predetermined distance and is electrically insulated from the sealing arrangement 3 by an insulating sleeve 10. At its end outside the cell, the rod 9 is connected via resistor 11 to metal sleeve 12 and hence in electrically conducting manner to the casing 1 and pole 8.

Providing that the sodium in the anode compartment is at a sufficiently high level to contact the rod 9 an electronically conducting path is thus provided between the poles 5 and 8 which shunts the cathode compartment of the cell. The value of the resistor 11 is chosen so that at the relevant operating voltages it will not pass a current which is high enough to damage the cell.

On activating the cell initially by bringing it to its operating temperature, cell discharge occurs via resistor 11 until the sodium level falls below the end of rod 9. Thereafter discharge will be through an external load (not shown). At a predetermined point of the discharge the sodium will reach level 13, i.e. the junction between the conductor rod 5 and the insulating rod 6. Thereafter conduction occurs via the film of sodium on the outside of the insulating rod 6. This conducting path is of relatively high resistance, particularly if the insulating rod surface is corrugated as shown, in a manner conventional for high voltage line insulators, and the cell voltage will therefore drop rapidly and this in turn will result in a substantial drop in the voltage of a battery of which the cell forms part. This drop in battery can be used to switch off the battery load.

On recharging the battery, the cell resistance will fall rapidly as the sodium level rises and reaches the conductor rod 5. It will then remain substantially constant until the sodium reaches the level 14, at which level it contacts the rod 9. When this happens the charging current will be shunted via resistor 11 and the sodium level will remain substantially constant, i.e. the cell will remain at this state of charge. Charging current can then continue to pass via resistor 11 indefinitely without damaging the cell.

Figure 2:
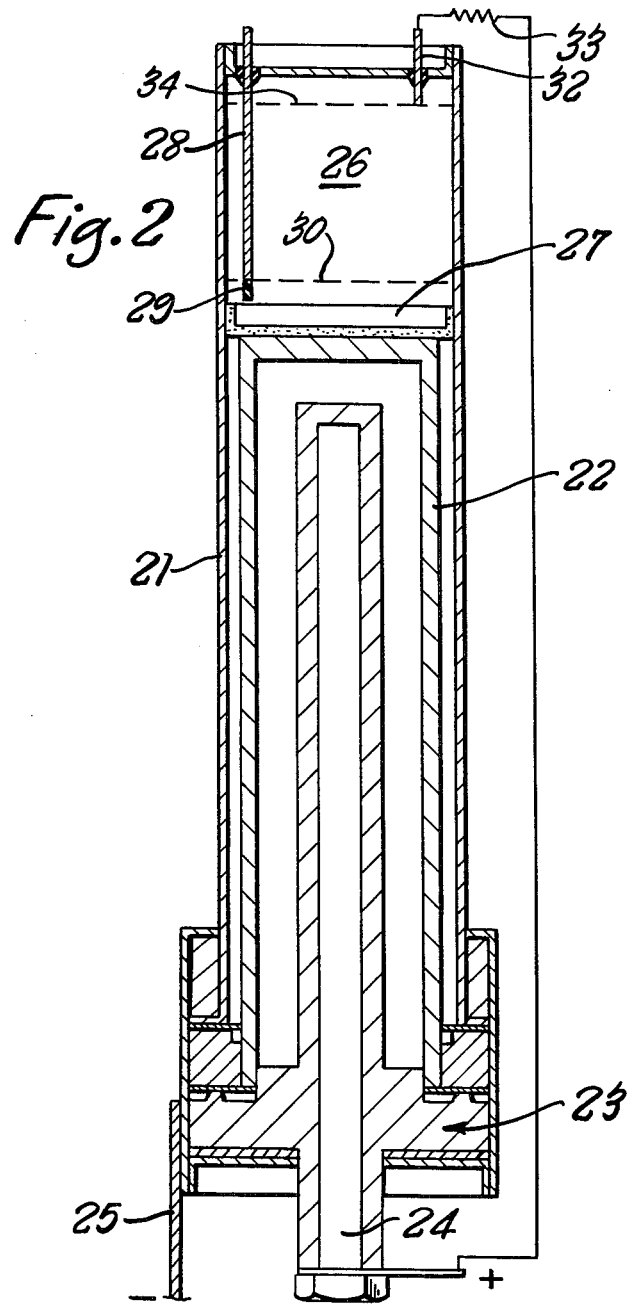
FIG. 2 shows a sectional elevation through the second cell construction.

Referring now to FIG. 2, the cell again is of tubular form, having an outer steel tubular casing 21 and an inner electrolyte tube 22 made of beta-alumina. In the construction of FIG. 2, the interior of the tube 22 constitutes the cathode compartment and therefore in the charged state of the cell contains sulphur. The annular space between the tubes 21 and 22 constitutes the anode compartment and therefore in the charged state of the cell contains sodium. The open lower ends of the tubes 21 and 22 are closed by a closure and sealing arrangement 23. Current collecting pole 24 in the form of a conducting rod extends into the tube 22 and a current collecting pole 25 is connected via the sealing arrangement 23 with the outer casing 21.

The outer casing 21 extends above the inner tube 22 to define a sodium reservoir 26 from which sodium is gravity fed via a restrictor 27 to maintain the annular space between the tubes 21 and 22 full of sodium during discharge of the cell.

To provide a sodium level detecting means corresponding to that described with reference to FIG. 1, an electronically conducting rod 28 extends down into the reservoir 1 and has a short rod 29 of insulating material joined to its lower end, the outer surface of the rod 29 being corrugated like the rod 6. Thus if the rod 28 is connected to a detector circuit, the change in resistance as the sodium falls below the level 30 can be used to limit the discharge of the cell, by switching off the load on the battery. Also a conducting rod 32 extends into the reservoir 26 to a predetermined level, and like the rod 9 of the FIG. 1 construction is connected via resistor 33 to the current collecting pole 24. Thus, as in the FIG. 1 arrangement, when the sodium reaches the level 34 during charging of the battery and contacts the rod 32, a shunt path is provided for the charging current.

As alternatives to providing the insulating rod portions 6 (FIG. 1) and 29 (FIG. 2) at the ends of the rods 5 and 28 respectively, the following may be provided:
(a) A resistance wire wound onto the lower end of the rods 5, 28 and extending beyond it; suitable materials for the resistance wire are constantan, nichrome, manganin, tungsten.
(b) The ends of the rods 5, 28 are provided with a screwed thread and a block of resistive material is screwed onto this. Suitable materials for the block are carbon and electrically conducting ceramics such as silicon carbide, boron carbide.
(c) The rods 5, 28 extend below the levels 13, 30 and are coated with an insulator, e.g. by glazing followed by a thin coating of high resistance material which contact the rods 5, 28 in the region of the levels 13, 30 to provide electrical continuity along the whole length of the rods; suitable materials are chromium, manganese, constantan or tungsten.

Figure 3:
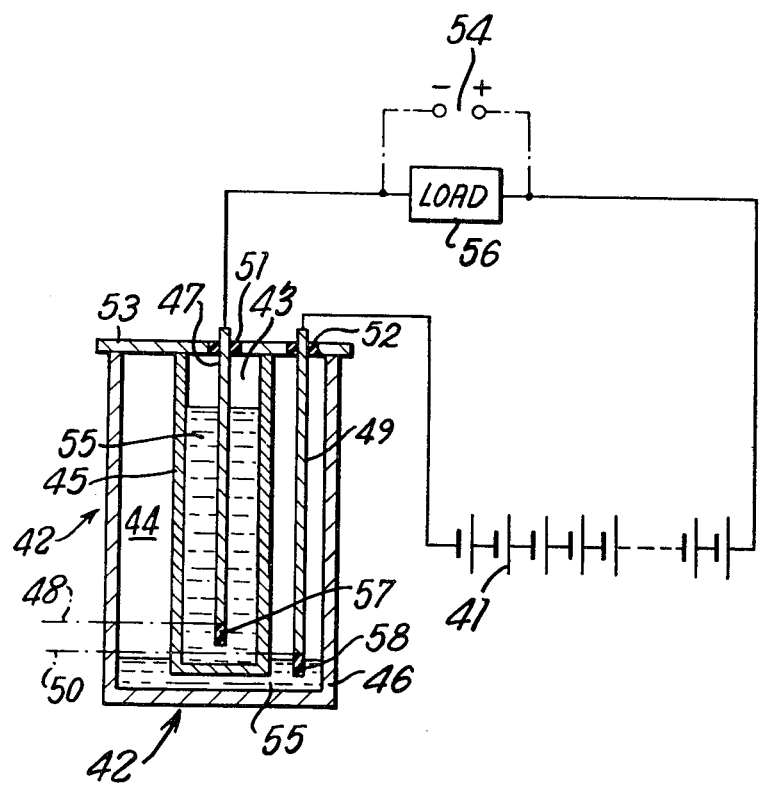
FIG. 3 shows a diagrammatic view of the battery construction.

Referring now to FIG. 3, this shows a sodium/sulphur battery comprising a group of sodium/sulphur cells 41 and a sodium/sodium cycling device 42 electrically connected in series with each other.

The device 42 has basically the same construction as the sodium sulphur cell shown in FIG. 1. Thus it has compartments 43 and 44 corresponding to the anode and cathode compartments of a sodium sulphur cell, the compartment 43 being defined by a beta-alumina container 45 and the compartment 44 being defined by the space beteween container 45 and an outer metal casing 46. A current conducting pole in the form of a rod 47 extends down the compartment 43 to a predetermined level indicated at 48 and a similar rod 49 extends down the compartment 44 to a predetermined level 50 and acts as the current conducting pole associated with the compartment 44. The rods 47 and 49 extend through insulating bushings 51 and 52 in cover 53.

Extending from the lower ends of the rods 47 and 49 below the levels 48 and 50 are extensions 57 and 58 of a higher electrical resistance material than the rods 47 and 49, for example of carbon or an electronically conducting ceramic such as silicon carbide or boron carbide so that as in the case of the sodium-sulphur cells constructions of FIGS. 1 and 2 when the sodium in the compartments 43 and 44 falls below the levels 48 and 50 there is an immediate decrease in the conductivity through the device 42.

Assuming that the battery has just been fully charged by connecting it to d.c. source 54, the majority of the molten sodium 55 contained within the device is in compartment 43 as shown in FIG. 3. If the battery is now connected to load 56, it will discharge at a rate dependent upon the size of the load. At the same time, because of the polarity of the voltage impressed upon the device 42 by the cells 41, sodium will be displaced by sodium ion transfer through the beta-alumina container 45 from compartment 43 to compartment 44. The end of the normal discharge period will be defined by the passage of the majority of the sodium metal from compartment 43 to compartment 44, such that the sodium falls to just below level 48 in compartment 43. This causes the higher resistance of extension 57 to be introduced into the conducting path of device 42 and the resultant fall in current can be used through appropriate circuitry to cut off the load from the battery. On re-charging by connecting the battery to d.c. source 48 the polarity of the connections to device 42 will be reversed and the sodium in compartment 44 will be displaced by sodium ion transfer into compartment 43. The end of the normal re-charging operation is defined by the passage of the majority of the sodium metal from the compartment 44 to compartment 43 so that the sodium in the compartment 44 falls to just below level 50 to introduce the higher resistance of extension 58 into circuit with a resultant fall in the charging current which can be used to cut off d.c. source 54 from the battery.

The "charge" and "discharge" times of the device 42 in relation to the charge and discharge times of the sodium-sulphur cells 41 can be accurately defined by the amount of sodium initially present in the device. The charge and discharge times set by the device 42 should be less than the minimum charge and discharge times of any cell in series with it.

I claim:

1. An arrangement for controlling an operating cycle of an alkali-metal/sulphur cell comprising an anode compartment containing alkali metal, a cathode compartment containing sulphur material, a solid electrolyte which is an alkali-metal ion conductor separating said anode and cathode compartments, an alkali-metal reservoir in communication with said anode compartment for supplying alkali metal to said anode compartment and respective current collecting poles for the anode and cathode compartments, said arrangement including detecting means in the form of an electronically conducting rod extending down into said reservoir to a predetermined high level and electrically connected to said current collecting pole for the cathode compartment of the cell, whereby when said rod is contacted by the upper surface of the alkali-metal in said reservoir when said alkali metal reaches said predetermined high level during a charging cycle, an electric circuit is completed between the current collecting poles through the alkali-metal in said reservoir via said rod to shunt the cathode compartment of the cell, and thereby substantially reduce the flow of charging current into the cell.

2. A system for controlling an operating cycle of an alkali-metal/sulphur battery comprising at least one group of alkali-metal/sulphur cells connected electrically in series with each other, which system includes an arrangement according to claim 1 in association with each individual cell.

3. A system for controlling an operating cycle of an alkali-metal/sulphur battery comprising at least one group of alkali-metal/sulphur cells connected electrically in series with each other, wherein at least one cell of the group is provided with an arrangement according to claim 1 and acts as a control cell for the battery.

4. An arrangement for controlling an operating cycle of an alkali-metal/sulphur cell comprising an anode compartment containing alkali metal, a cathode compartment containing sulphur material, a solid electrolyte which is an alkali-metal ion conductor separating said anode and cathode compartments and an alkali-metal reservoir in communication with said anode compartment for supplying alkali metal to said anode compartment, said arrangement including detecting means in the form of an electronically conducting rod extending down into said reservoir so that it is contacted by the alkali-metal in said reservoir to complete an electric circuit through the alkali-metal in said reservoir, said rod having an extension selected from insulating and high resistance material at its lower end whereby when, during the discharge of the cell, said alkali-metal reaches a predetermined low level in said reservoir such that its upper surface contacts said extension a high resistance is introduced into said circuit to effect a substantial reduction of the flow of discharge current from the cell.

5. An arrangement according to claim 4 wherein said extension is insulating material extending below said predetermined low level, the outer surface of said extension being so configured that it will retain a film of said alkali metal to complete a conducting path to said rod, said conducting path being of higher resistance than said rod.

6. An arrangement according to claim 4 wherein said extension comprises an electrical resistance connected to the lower end of said rod and extending below said predetermined low level.

7. An arrangement according to claim 6 wherein said extension comprises a coiled resistance wire wound onto the lower end of said rod.

8. An arrangement according to claim 6 wherein said extension comprises a block of material screwed to the lower end of said rod.

9. An arrangement according to claim 6 wherein said rod has an extension below said predetermined low level, said extension being coated with a layer of insulating material on which a second coating of a higher resistance material than said rod is provided, said second coating contacting said rod in the region of said predetermined low level.

10. An arrangement for controlling an operating cycle of an alkali-metal/sulphur battery comprising at least one group of alkali-metal/sulphur cells connected electrically in series with each other, an alkali-metal/alkali-metal cycling device connected electrically in series with said group and acting as a control cell for the battery, said alkali-metal/alkali-metal cycling device comprising two compartments containing alkali-metal, an alkali-metal ion conductor separating said two compartments and a respective current conducting pole extending down into each compartment and through which said cycling device is connected electrically in series with said group of cells through the alkali metal in said compartments and detecting means disposed in each of said compartments and comprising extensions selected from insulating or high resistance material at the lower ends of said poles, whereby when the level of alkali-metal in either of said compartments reaches a predetermined low level such that its upper surface contacts a respective one of said extensions a high resistance is introduced into the charge/discharge circuit of said group of cells, whereby to substantially reduce the current flow to and from said group of cells.

* * * * *